Patented Aug. 15, 1950

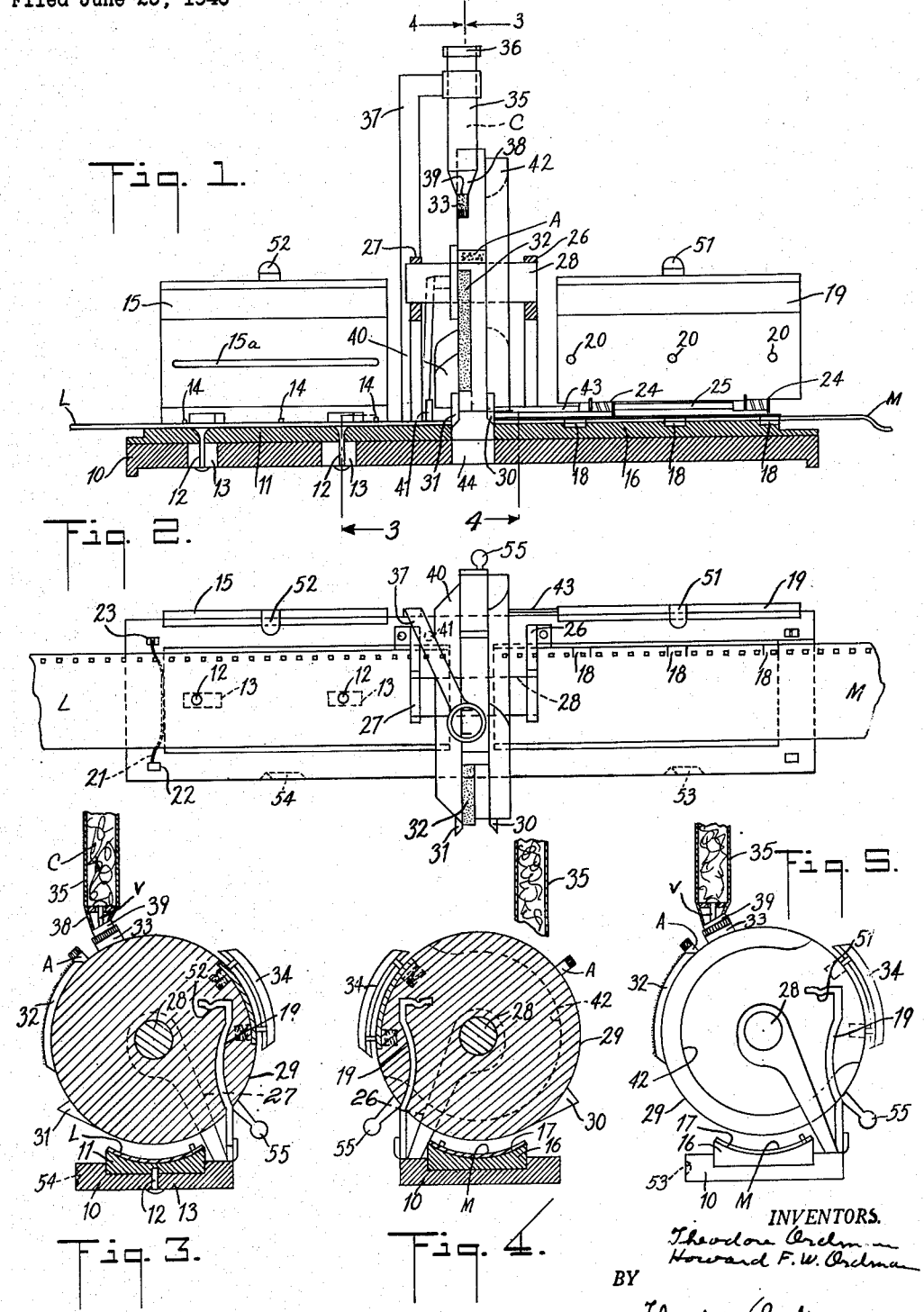

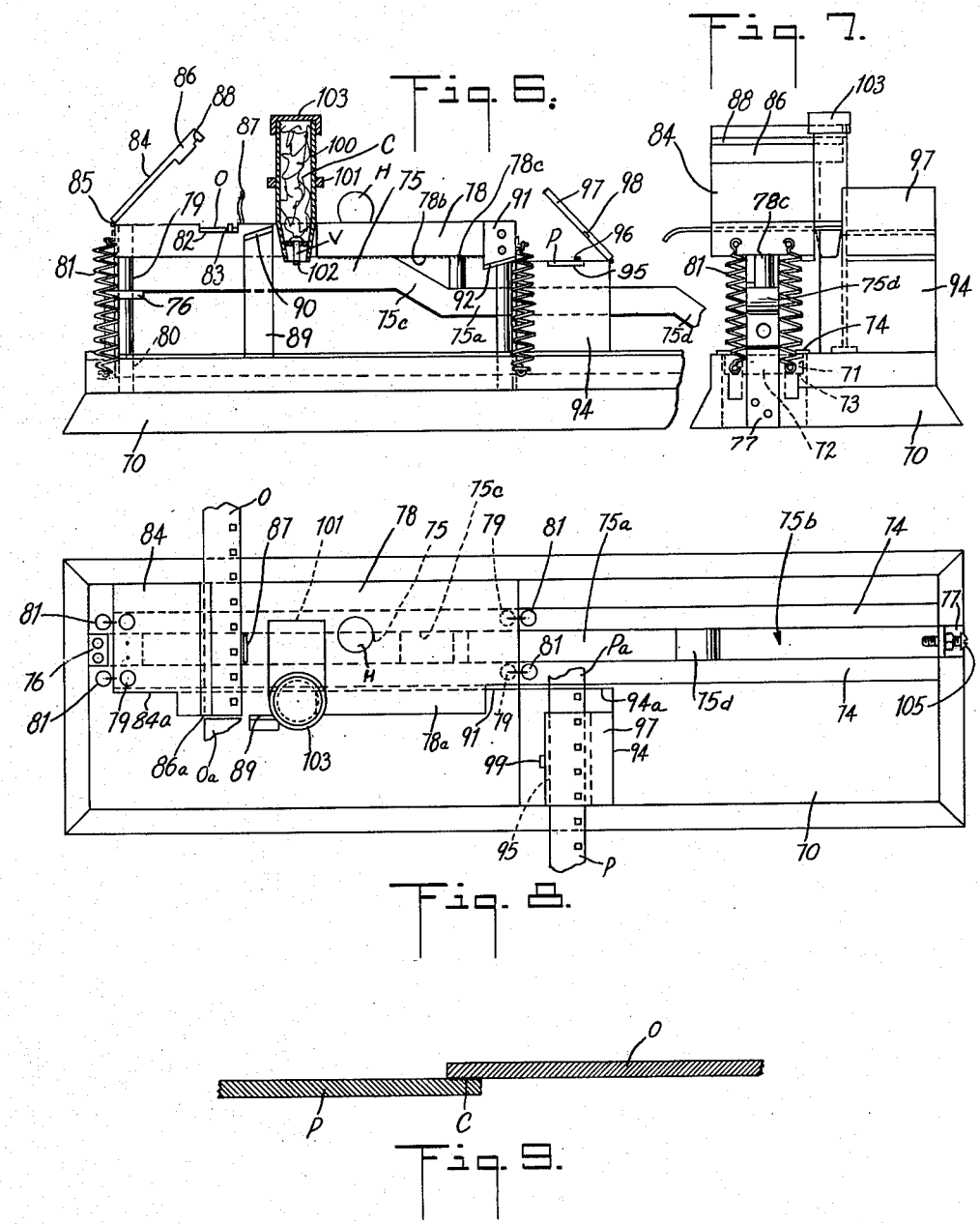

2,518,927

UNITED STATES PATENT OFFICE 2,518,927

FILM SPLICER

Theodore Ordman, Brooklyn, and Howard F. W. Ordman, New York, N. Y.

Application June 25, 1946, Serial No. 679,110

5 Claims. (Cl. 154—42.1)

This invention relates to a film splicer and more particularly to a device of this character that is semi-automatic in its operation and permits film splicing to be effected as a continuous operation.

In splicing of film, it is necessary to trim or true the torn edges of each torn length; scrape the emulsion from the surface adjacent one of the trued edges, apply cement to this scraped surface, overlap the other trued edge over the cement-bearing surface and apply and maintain pressure to the lapped film edges until the cement sets. An object of this invention is to provide a device in which this sequence of steps will be effected simply and quickly in a continuous operation of a moving part.

Another object of the invention is to provide simple, easily constructed devices for effecting the foregoing that may be manufactured at relatively low cost.

To the accomplishment of the foregoing and such other objects as may hereinafter appear, the invention consists in the novel construction and arrangement of parts hereinafter to be described and then sought to be defined in the appended claims, reference being had to the accompanying drawing forming a part hereof, which shows, merely for the purposes of illustrative disclosure, preferred embodiments of the invention, it being expressly understood, however, that changes may be made in practice within the scope of the claims without digressing from the inventive idea.

In the drawing:

Fig. 1 is a front elevation of one form of device embodying the invention;

Fig. 2 is a top plan view thereof;

Fig. 3 is a vertical section taken along line 3—3 of Fig. 1 and viewed in the direction of the arrows;

Fig. 4 is a vertical section taken along line 4—4 of Fig. 1 and viewed in the direction of the arrows;

Fig. 5 is a side elevation viewed from the right of Fig. 1;

Fig. 6 is a partial front elevation of a modified form of construction;

Fig. 7 is a side elevation of the device of Fig. 6;

Fig. 8 is a top plan view of the device of Figs. 6 and 7; and

Fig. 9 is a sectional elevation of film spliced by either device.

Referring to the drawing, the base or table 10 has a groove in which is mounted a slidably concave plate member 11 that is reciprocally movable over the upper face of the table groove by means of the pin and slot connection therewith 12, 13, respectively. This concave plate member 11 has upstanding teeth 14 adapted to engage in the perforations in one length L of the torn film. A longitudinally slidable clamp plate 15 having a convex portion to fit the concave slide 11 is secured pivotally to the table 10 and serves to clamp the length L of the film to the concave slidable plate member 11 with the teeth 14 engaging in its perforations. The plate 15 is slotted at 15a to receive the teeth 14.

A raised platform 16 is provided on table 10. This platform has a concave film receiving groove 17 in its upper face. The height of this platform 16 is admeasured so that its concave groove face lies slightly above the level of the upper surface of the film L secured by slide plate 11 for purposes presently to be described. This concave surface of platform 16 has longitudinally extending slots 18 in a concave film receiving groove which are positioned to underlie the film perforations for a purpose that will become apparent.

A longitudinally slidable clamp plate 19 having a convex portion to fit the groove in platform 16 is secured pivotally to the table 10 and serves to clamp the length M of the torn film in the concave groove 17. Teeth 20 on the plate 19 are positioned to enter various of the perforations of the film M when the plate 19 is swung into clamping position and to extend through the film perforations into the slots 18 so that when the plate 19 is slid longitudinally its teeth 20 will cause corresponding movement of the film M for a purpose to be described.

The convex slide plate 11 is normally urged toward the plate 19 by a spring 21, one end of which is fixed at 22 to the table 10 and the other end of which is guided slidably between the fixed guides 23. The clamp plate 19 is normally urged longitudinally toward the slide plate 11 by springs 24 conveniently positioned on the pivot shaft 25 of the plate 19.

A pair of upstanding brackets 26, 27 rotatably support a shaft 28 which carries a wheel 29. This wheel has a pair of knife blades 30, 31 mounted on its opposite faces and extending outwardly of the wheel's periphery. A serrated or file portion or abrasive segment 32 is provided over an arcuate length of the wheel's periphery to one side of the central plane of the wheel. A radially extending cleaning brush A, extending the full width of wheel 29 on its periphery, lies at the remote end of the portion 32. A radially extending brush 33 is also mounted on an arcuate length of the wheel's periphery to the same one side of the central plane of the wheel. An elevated spring-actuated pressure-applying surface 34 is also provided along the wheel's periphery for an arcuate length thereof and extends preferably the full width of said wheel.

A tank or receptacle 35 having a removable cover 36 is carried on a supporting bracket 37 extending from table 10. This tank has an outlet end 38 in which a wick 39 is positioned. This wick lies in such relationship to brush 33 that as the latter sweeps past it, it becomes moistened with cement C from within tank 35.

The wheel 29 has a face cam 40 on which a rod 41 upstanding from the slide plate 11 operates as a cam follower. This face cam 41 is so arranged as normally to maintain the slide plate 11 in retracted position away from the wheel 29.

A similar face cam 42 is mounted on the opposite face of the wheel 29. A pin 43 projecting from the plate 19 operates on this cam 42 as a cam follower. This face cam 42 is so arranged as to maintain the clamp plate 19 normally in retracted position away from the wheel 29.

A transverse slot 44 is provided in the table 10 through which debris may fall. The curvature of the grooves in slide 11 and in platform 16 are complementary with that of the wheel periphery.

The clamp plates 15 and 19 have spring catches 51, 52 that are engageable respectively in slots 53, 54 provided on the front face of plate 10.

An operating handle 55 extends from the periphery of wheel 29.

In operating the device, the handle 55 is rotated to its rearmost position shown, and the clamp plates 15 and 19 are swung to open position shown. Then the length L of the torn film has its perforations mounted upon the teeth 14 of slide 11 with the torn end overhanging the inner edge of said slide. Similarly the length M of the film is mounted in the groove 17 with its torn end overhanging the inner edge of platform 16. The clamp plate 15 is then swung to closing position as is clamp plate 19, the film M being manipulated so that the teeth 20 of said plate 19 pass through respective perforations of the film M into slots 18. At this time the pins 41 and 43 engage high portions of the respective face cams 40, 42. The handle 55 is then operated to rotate wheel 29. In such operation first the knives 30, 31 respectively sever the torn ends of the film lengths L and M trueing their edges and these severed lengths fall through slot 44. Continued rotation of wheel 29, causes pin 41 to ride into a lower portion of face cam 40 and spring 21 then acts to shift slide 11 longitudinally toward wheel 29 and underneath its periphery to a distance equal substantially half its width, namely, to the line of its central plane. Face cam 42 in the meantime is still high maintaining clamp plate 19 in retracted position. In further rotation, the serrated or abrasive segment 32 now abrades or removes emulsion from the upper face of film L adjacent its trued end, which is backed by the concave slide 11 whose curvature is complementary to that of wheel 29. Further rotation of wheel 29 causes the brush A to sweep the debris from the face of the abraded end of film L. Then brush 33, which during rotation of wheel 29 has been moistened with cement C by wick 39, sweeps over the abraded end of film L depositing a layer of cement thereon. On completion of this act, further rotation of wheel 29 brings a lower surface of face cam 42 opposite pin 43 causing springs 24 to shift clamp plate 19 longitudinally toward wheel 29 a distance sufficient for the under face of the trued end of film length M to overlap the cement covered upper face of film L. Further rotation of wheel 29 brings the spring-actuated pressure-applying surface 34 into pressing engagement with the upper face of film length M pressing it tightly against the cement-bearing surface of film L and maintaining it in this condition for a time sufficient for the cement to set. The wheel 29 is then rotated in the opposite direction to clear surface 34 from the spliced film. The clamp plates 15 and 19 are then released and the spliced film removed. Wheel 29 is then returned to its initial position ready for the next film splicing operation.

A modified form of construction is shown in Figs. 6–8 inclusive. In this embodiment the rotary element is replaced by a longitudinally movable element. Referring to these figures, the base 70 has a longitudinally extending guideway 71 which receives a slide 72 which rests on the shoulders 73 within the guideway and is held therein by the overlapping shoulders 74.

A cam rod 75 is supported from the base 70 by brackets 76, 77 secured respectively to the base and to rod 75 at opposite ends of each. A plate member 78 overlies the cam rod 75 and has downwardly depending guide plungers 79 affixed thereto which extend through openings 80 provided within the slide 72. Springs 81 attached at their opposite ends to the slide 72 and to the plate member 78 tend normally to draw the latter toward the slide 72 to the limit permitted by the cam rod 75. This rod 75 has a portion 75a at a lower elevation than the portion 75 and a second portion 75b at a similar extent of lower elevation relative to portion 75a as portion 75a is with respect to portion 75, the various portions being connected by the inclines 75c, 75d. The forward end of plate member 78 overhangs the portion 75a of the cam rod 75 and has a dependent cam follower 78c that is movable along the upper surface of cam portions 75a and 75b and incline 75d.

Plate member 78 has a transversely extending groove 82 in its upper face to receive the torn length of film O and the usual pins 83 which engage within the perforations of the film length O. A clamp plate 84 is hingedly connected at 85 to the plate 78 and may be rotated about its hinge 85 into and out of clamping position. The clamp plate 84 has a laterally extending raised portion 86 that enters into the film receiving slot 82 when the plate 84 is in clamping position serving to clamp the film O firmly to plate 78. A suitable snap catch 87 serves to maintain the clamp plate 84 in its clamping position. A slot 88 within the portion 85 receives the pins 83 in the clamping position of plate 84. The raised portion 86 extends laterally of the side edges 84a of the clamp plate and its end 86a serves as one film shearing edge as will be presently described.

A knife or shearing member 89 is supported vertically from the base 70 and its shearing edge 90 is adapted to cooperate with the shearing end 86a to true the clamped film length O by trimming off its torn edge Oa (Fig. 8) when the plate member 78 is moved longitudinally.

A portion 78a of the plate member 78 extends laterally thereof and the underface of this portion 78a is serrated at 78b or otherwise provided with an abrading surface for a purpose presently to be described.

A knife or shearing member 91 is attached suitably to the plate member 78 in advance of the portion 78a and its shearing edge 92 serves, as will be described, to operate on the other torn length P of film.

A block member 94 is carried by the base 70. This block member has a height only slightly less than the height of the underface of plate 78 above the base 70. The inner edge 94a of this block member is so positioned that it lies substantially in the same plane as the cutting edge 92 of the knife 91 forming the cooperating shearing edge therefor. A transverse guideway 95 is provided on the upper face of block member 94 and has the usual perforation engaging pins 96 to engage the perforations of the film length P. A clamp plate 97 is hingedly attached to the block member 94. This clamp plate 97 has a slot 98 to receive the pins 96 when in clamping position. A snap catch 99 serves to lock the clamp plate 97 in its clamped position when the film length P has been mounted on the pins 96.

A suitable receptacle 100 is carried conveniently by a bracket 101 from the plate member 78. The outlet end of the receptacle has a wick 102 that is positioned to lie just below the level of the upper face of film P for a purpose to be described. Cement C is provided within the receptacle 100. A removable cover 103 is provided for the receptacle 100.

In operating the device, the torn length of film O is clamped to plate 78 as described with its torn end Oa overhanging the edge 86a of the clamp plate. Similarly the torn length P of the film is clamped to block member 94 as described with its torn edge Pa overlying the shearing edge 94a of the block member. The plate member 78 is then slid longitudinally. The knife edge 90 shears off the torn edge Oa of the film length O and the knife edge 92 shears off the torn edge Pa of the film length P. Then the serrated or abrading surface 78b which is of appropriate length to abrade the film effectively removes the emulsion from the upper face of the trimmed film length P adjacent its trued edge and immediately thereafter the wick 102 applies cement C to the abraded film surface. As this operation is completed, the cam follower 78c moves along incline 75d to portion 75b of the cam bar 75 while the rear edge of plate 78 moves along the incline 75c onto the portion 75a of the cam bar, the springs 81 functioning to provide this action. When the movement just described has been completed the underface of trued end of film O lying just below the overhanging portion 86 of clamp plate 84 lies aligned over the cement applied upper face of film length P and is spring pressed against it and held in such pressing engagement until the cement C has set. The clamp plates 84 and 97 are then opened and the spliced film lengths O and P shown in Fig. 9 removed from the device. The plate 78 is then returned to its initial position for the next splicing job.

Fig. 9 illustrates the spliced film resulting from the use of either device herein described.

The abrasive surfaces 32 or 78b may, for example, consist of strips of sandpaper or other abrasive paper or material cemented to or removably applied in convenient manner respectively to the disc 29 or the portion 78a.

If desired, the tank 100 may be omitted and the cement C may be applied manually to the abraded surface Pa of the film length P just after the latter has been abraded.

It is to be understood, of course, that the two film lengths O and P must be in perfect alignment when they are cemented together and that the perforation engaging pins 14 and 20, or 83 and 96 must be so positioned that when overlap occurs, the film lengths M and O lie in relation to the respective film lengths L or P so that the perforations at the splice likewise overlie each other. In the embodiment of Figs. 6 to 8 a suitable set screw 105 functions to insure the alignment of the films at the splicing position.

The tanks 35 or 100 may be equipped with one way valves V such as tire valves that are opened to permit outward flow of cement when the wicks 39 or 102 are pressed inwardly by the brush 33 or film P so that cement will be applied as needed to the appropriate film surfaces.

A handle H for reciprocating the slide plate 78 may be provided. This may be replaced by a rack and crank operated gear or other equivalent mechanism if desired.

While specific embodiments have been shown, it is to be understood that variations in structural detail are possible and are contemplated. There is no intention, therefore, of limitation to the exact details shown and described.

What is claimed is:

1. In a device of the character described, means for clamping a torn length of film, means for moving said clamped length of film transversely, means for clamping a second torn length of film, means for severing the torn edges and trueing said clamped lengths of film, mean movable with said first-named clamped length of film for abrading the surface of said second-named length of film adjacent its trued edge, means movable with said first-named clamped length of film for applying cement to the abraded surface, and means for guiding said trued edge of said first-named length of film into overlapping and into pressing relationship with said abraded surface.

2. In a device as per claim 1, a longitudinally slidable guide plate to which said first-named clamping means are attached, said abrading means being applied to said plate.

3. In a device as per claim 1, a longitudinally slidable guide plate to which said first-named clamping means are attached, a longitudinally movable slidable member, tension spring means for drawing said slidable guide plate toward said slidable member, said guide means regulating the extent of their approach during longitudinal motion of said guide plate and said slide member, said abrading means being attached to said slidable guide plate, and said cement applying means also being carried by said slidable guide plate.

4. In a device of the character described, means for clamping a torn length of film, means for clamping a second torn length of film, a movable carriage for one of said two clamped lengths of film, said carriage being movable transversely of the length of said film to a lapping position over the other clamped length of film, means for trueing the torn edges of the clamped lengths of film, during movement of said carriage toward said lapping position, means for abrading a portion of the surface of one of the lengths of film adjacent its torn edge during such movement, and means for pressing a portion of the other length of film adjacent its trued edge against said abraded portion when said carriage has been moved to said lapping position.

5. In a device of the character described, clamping means for a torn length of film, means for moving the clamped length of film transversely, clamping means of a second torn length of film, severing means for trueing the torn edges of the clamped lengths of film, abrading means movable with said first-named moving means for abrading the surface of said second-named length of film adjacent its trued edge, cement applying means for applying cement to the abraded surface, and guiding means for guiding the trued edge of said first-named length of film into overlapping and into pressing relationship with said abraded surface.

THEODORE ORDMAN.
HOWARD F. W. ORDMAN.

REFERENCES CITED

The following references are of record in the file of this patent:

UNITED STATES PATENTS

| Number | Name | Date |
|---|---|---|
| 1,121,765 | Schultze | Dec. 22, 1914 |
| 1,324,686 | Mitzger | Dec. 9, 1919 |
| 1,714,605 | Leo | May 28, 1929 |
| 1,734,140 | McLaughlin et al. | Nov. 5, 1929 |
| 1,734,141 | McLaughlin et al. | Nov. 5, 1929 |
| 2,231,383 | Goldberg | Feb. 11, 1941 |